(12) United States Patent
Ebersole

(10) Patent No.: US 8,266,392 B2
(45) Date of Patent: Sep. 11, 2012

(54) CACHE ACCESS MECHANISM

(75) Inventor: Steven Ebersole, Austin, TX (US)

(73) Assignee: Red Hat, Inc., Raleigh, NC (US)

( * ) Notice: Subject to any disclaimer, the term of this patent is extended or adjusted under 35 U.S.C. 154(b) by 799 days.

(21) Appl. No.: 11/849,123

(22) Filed: Aug. 31, 2007

(65) Prior Publication Data

US 2009/0063781 A1    Mar. 5, 2009

(51) Int. Cl.
*G06F 13/00* (2006.01)
(52) U.S. Cl. ......................... 711/154; 707/736
(58) Field of Classification Search ............... 711/141, 711/154; 707/201, 736
See application file for complete search history.

(56) References Cited

U.S. PATENT DOCUMENTS

| 2005/0144610 | A1* | 6/2005 | Zenz | 717/168 |
| 2006/0248131 | A1* | 11/2006 | Marwinski et al. | 707/206 |
| 2008/0235292 | A1* | 9/2008 | Janin et al. | 707/201 |

OTHER PUBLICATIONS

Ashley J.S. Mills, "ANTLR", copyright 2005, The University of Birmingham, 32pp.
Alberto Montresor, et al., "Jgroup Tutorial and Programmer's Manual", Feb. 2002, 53pp.
"PojoCache", User Documentation, Release 1.4.1 "Cayenne", 38pp.
ManikSurtani, et al., "JBoss Cache User Guide", A clustered, transactional cache, Release 2.0.0 Habanero, Jun. 2007, Copyright © 2004, 2005, 2006, 2007 JBoss, a division of Red Hat Inc., 92pp.
"Hibernate Tools", Reference Guide, Version: 3.2.0.beta9, 49pp.
"Hibernate Shards", Horizontal Partitioning with Hibernate, Version: 3.0.0.Beta1, 20pp.
"Hibernate Search", Apache Lucene Integration, Version: 3.0.0. Beta1, 22pp.
Hibernate Reference Documentation, Version: 3.2.2, 229pp.
Hibernate EntityManager, User Guide, Version 3.3.0.GA, 52pp.
Hibernate Annotations, Reference Guide, Version 3.3.0.GA, 58pp.

* cited by examiner

*Primary Examiner* — Jared Rutz
(74) *Attorney, Agent, or Firm* — Lowenstein Sandler PC

(57) ABSTRACT

Techniques for improving cache accesses in an object-relational mapping space are described herein. In one embodiment, in response to a first cache request received at a first cache API associated with a transaction for updating a data entry of the relational database, the updated data of the data entry is stored in a local cache, where the local cache is one of members of a cache cluster, and an invalidation message is sent to remaining members of the cache cluster to invalidate corresponding cache entries of the remaining members. In response to a second cache request received at a second cache API associated with a transaction for loading data from a data entry of the relational database, the loaded data is stored in the local cache without sending an invalidation message to the remaining members of the cache cluster. Other methods and apparatuses are also described.

22 Claims, 4 Drawing Sheets

CACHE ACCESS MECHANISM

TECHNICAL FIELD

The present invention relates generally to object relational mapping in database management. More particularly, this invention relates to improved cache accesses in object relational mapping.

BACKGROUND

Data management tasks in object-oriented programming are typically implemented by manipulating objects, which are typically non-scalar values. Consider the example of an address book entry, which represents a single person along with zero or more phone numbers and zero or more addresses. This could be modeled in an object-oriented implementation by a "person object" with "slots" to hold the data that comprise the entry: the person's name, a list (or array) of phone numbers, and a list of addresses. The list of phone numbers would itself contain "phone number objects" and so on. The address book entry is treated as a single value by the programming language (it can be referenced by a single variable, for instance). Various methods can be associated with the object, such as a method to return the preferred phone number, the home address, and so on.

Many popular database products, however, such as SQL DBMS products, can only store and manipulate scalar values such as integers and strings, organized within tables. A programmer must either convert the object values into groups of simpler values for storage in the database (and convert them back upon retrieval), or only use simple scalar values within the program. Object-relational mapping is used to implement the first approach.

Object-relational mapping (aka O/RM, ORM, and O/R mapping) is a programming technique for converting data between incompatible type systems in databases and object-oriented programming languages. This creates, in effect, a "virtual object database" which can be used from within the programming language.

Typically, an ORM system provides an application programming interface (API) to access a cache which may be implemented locally or in a cluster manner. Typically, when a data entry is accessed, the content of the data entry is replicated in a local cache and an invalidation message is sent to other caches in the cluster. Although certain data accesses may not require invalidating other caches, such an invalidation message is still sent which causes certain unnecessary communication traffic.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for improving cache accesses in an object-relational mapping space are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
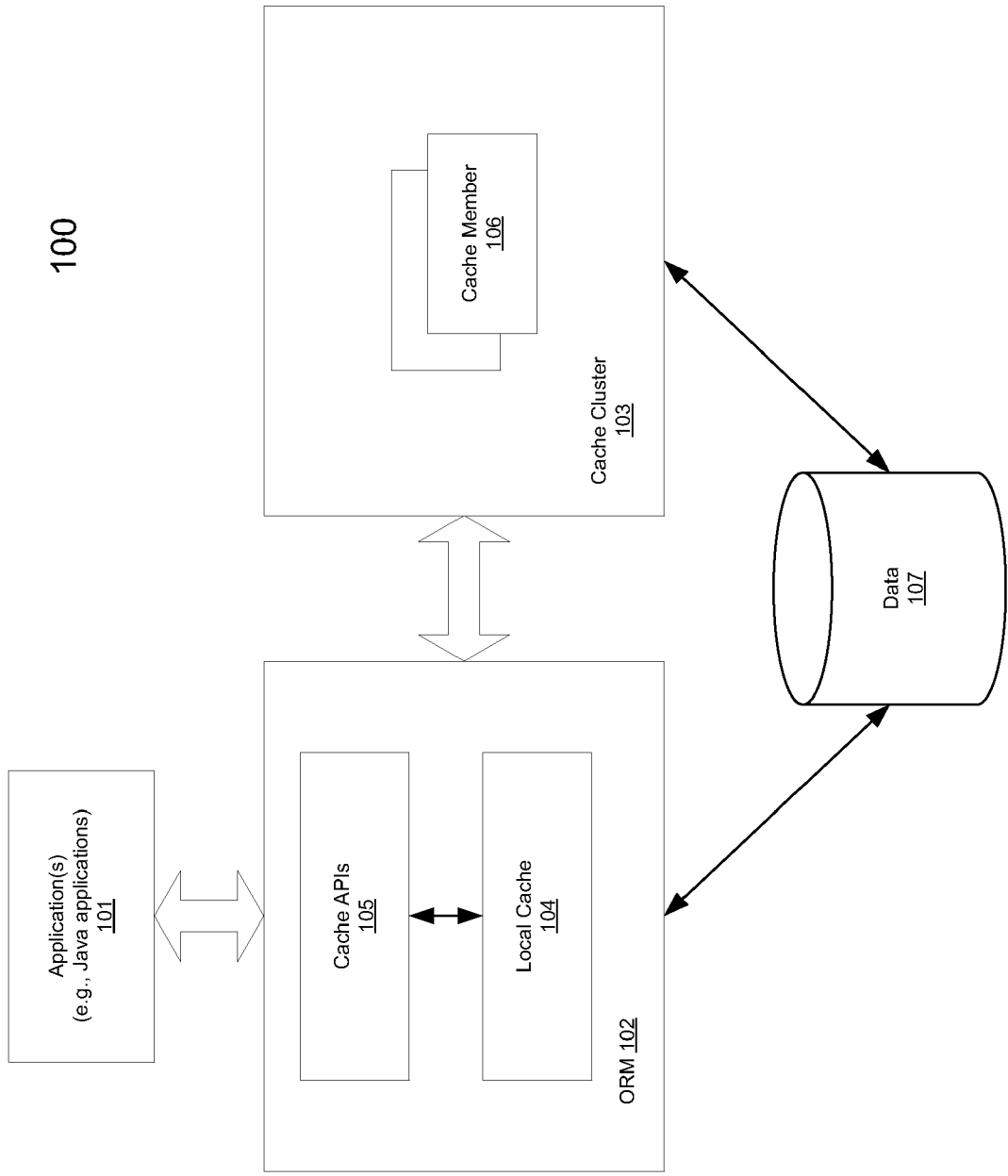
FIG. 1 is a block diagram illustrating an application framework which may be used with one embodiment of the invention.

FIG. 1 is a block diagram illustrating an application framework which may be used with one embodiment of the invention. Referring to FIG. 1, framework 100 includes, but is not limited to, an application client 101 accessing a database or data store 103 through a common query API (application programming interface) 102 with object-relational mapping (ORM) features, also referred to as an ORM module or ORM system. The API 102 provides the ability to map an object model's data representation to a relational data model and its corresponding database schema. For example, in a Java computing environment, the API 102 takes care of the mapping from Java classes to database tables and from Java data types to SQL (structured query language) data types used in a database. Note that throughout this application and for the purposes of illustration only, Java is used as an example of a cross-platform programming language. However, it is not so limited; other cross-platform programming languages, such as .NET, etc., may also be applied. The API 102 provides data query and retrieval facilities that reduce development time, which is designed to relieve a software developer from most of common data persistence-related programming tasks by reducing the need for manual, hand-crafted data processing using SQL and JDBC (Java database connectivity). The JDBC API is the industry standard for database-independent connectivity between the Java programming language and a wide range of databases—SQL databases and other tabular data sources, such as spreadsheets or flat files.

According to one embodiment, ORM 102 includes one or more cache APIs 105 and a local cache 104 for caching content of certain entries stored in a database or data store 107. In addition, the local cache 104 may be implemented as part or a member of a cache cluster 103 having multiple caches or cache members 106. Cache cluster 103 may be implemented locally with respect to ORM 102 (e.g., in different virtual machines or VMs). Alternatively, cache cluster 103 may be implemented remotely over an interconnect or network, which may be a local area network (LAN) or a wide area network (WAN) such as the Internet. Similarly, data store 107 may be implemented locally or remotely over a network.

A cache may be organized as a tree with a single root. Each node in the tree essentially contains a map, which acts as a store for key/value pairs. A cache can be either local or replicated. Local trees may exist inside the JVM in which they are created, whereas replicated trees propagate any changes to some or all other trees in the same cluster. A cluster may span different hosts on a network or just different JVMs on a single host.

According to certain embodiments, when a change is made to an object in the cache and that change is done in the context of a transaction, the replication of changes is deferred until the transaction commits successfully. All modifications may be kept in a list associated with the transaction for the caller.

When the transaction commits, the system replicates the changes. Otherwise, (on a rollback) the system may simply undo the changes locally resulting in zero network traffic and overhead. For example, if a caller makes 100 modifications and then rolls back the transaction, the system will not replicate anything, resulting in no network traffic.

If a caller has no transaction associated with it, the system will replicate right after each modification, e.g. in the above case we would send 100 messages, plus an additional message for the rollback. In this sense, running without a transaction can be thought of as analogous as running with autocommit switched on in JDBC terminology, where each operation is committed automatically. The replication may be performed synchronously or asynchronously. During a synchronous replication, the replicated caches replicate all changes to the other caches in the cluster. Synchronous replication means that changes are replicated and the caller blocks until replication acknowledgements are received. During an asynchronous replication, replicated caches replicate all changes to the other caches in the cluster. However, being asynchronous, the caller does not block until replication acknowledgements are received.

In addition, instead of replicating content from one cache to another cache, an invalidation message may be used to notify a cache that its data is stale and may need to update from the data store. If a cache is configured for invalidation rather than replication, every time data is changed in a cache other caches in the cluster receive a message (e.g., invalidation message) informing them that their data is now stale and should be evicted from memory. Invalidation, when used with a shared cache loader would cause remote caches to refer to the shared cache loader to retrieve modified data. The benefit of this is twofold: network traffic is minimized as invalidation messages are very small compared to replicating updated data, and also that other caches in the cluster look up modified data in a lazy manner, only when needed.

In one embodiment, invalidation messages are sent after each modification (e.g., no transactions), or at the end of a transaction, upon successful commit. This is usually more efficient as invalidation messages can be optimized for the transaction as a whole rather than on a per-modification basis. Invalidation too can be synchronous or asynchronous, and just as in the case of replication, synchronous invalidation blocks until all caches in the cluster receive invalidation messages and have evicted stale data while asynchronous invalidation works in a 'fire-and-forget' mode, where invalidation messages are broadcast but do not block and wait for responses.

Figure 3:
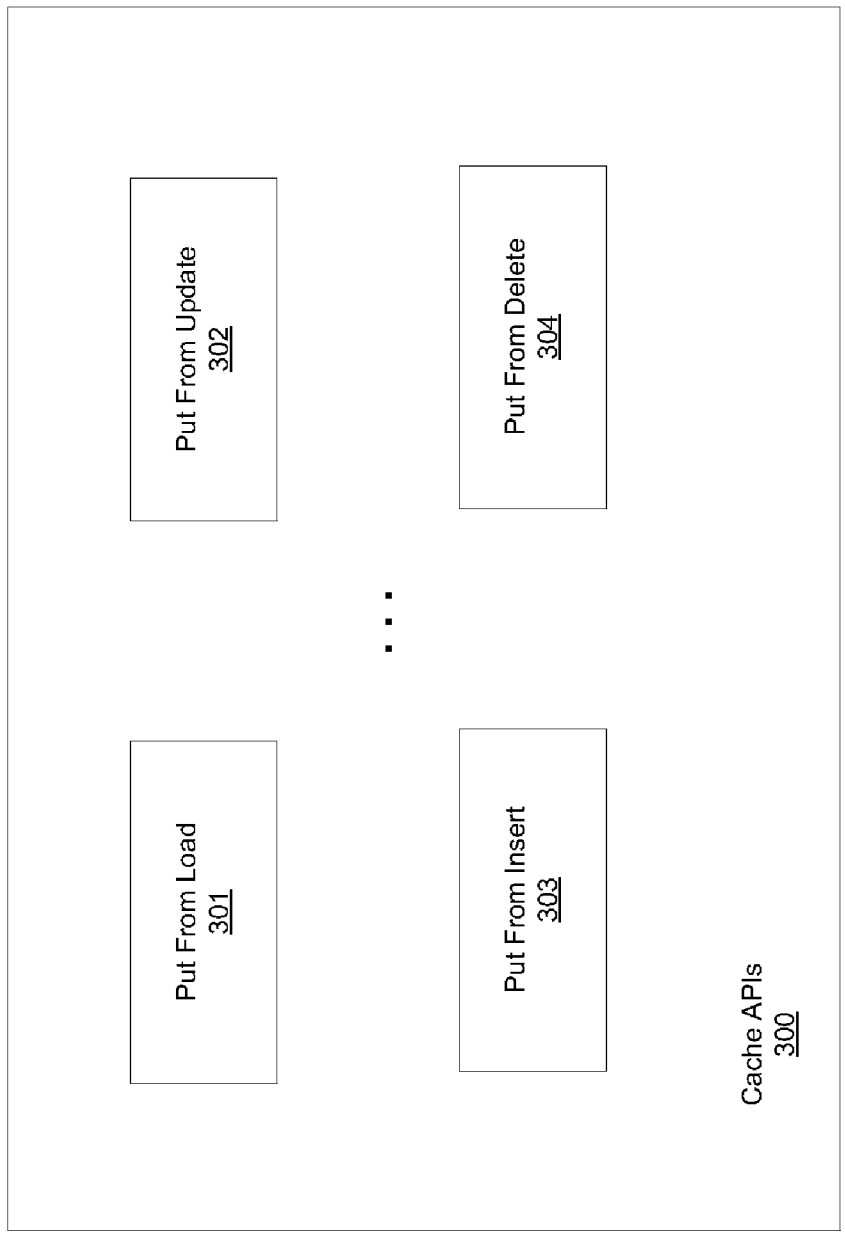
FIG. 3 is a diagram illustrating an example of cache APIs according to one embodiment of the invention.

Referring back to FIG. 1, according to one embodiment, cache APIs 105 include multiple specific interfaces having specific functionalities. An example of the cache APIs 105 is shown in FIG. 3 for the purposes of illustration. Referring to FIG. 3, in this example, cache APIs 300, which may be implemented as part of cache APIs 105 of FIG. 1, include APIs 301-304. For example, API 301 (e.g., "put from load") may be used to write a copy of data into the cache when the data is loaded from a data store. Similarly, APIs 302-304 may be used to update the cache when the corresponding data entry in the data store is updated, inserted, or deleted.

In one embodiment, not all APIs 301-304 require sending an invalidation message to other caches in the cluster. For example, API 301 which is a "put from load" may not require sending an invalidation message to other caches of the cluster because there is no change in the data entry. However, APIs 302-304 may require sending an invalidation message to other caches to inform them there is a change in the data entry. Note that some or all of the components as shown in FIGS. 1 and 3 may be implemented in software, hardware, or a combination of both. Other configurations may also exist.

Figure 2:
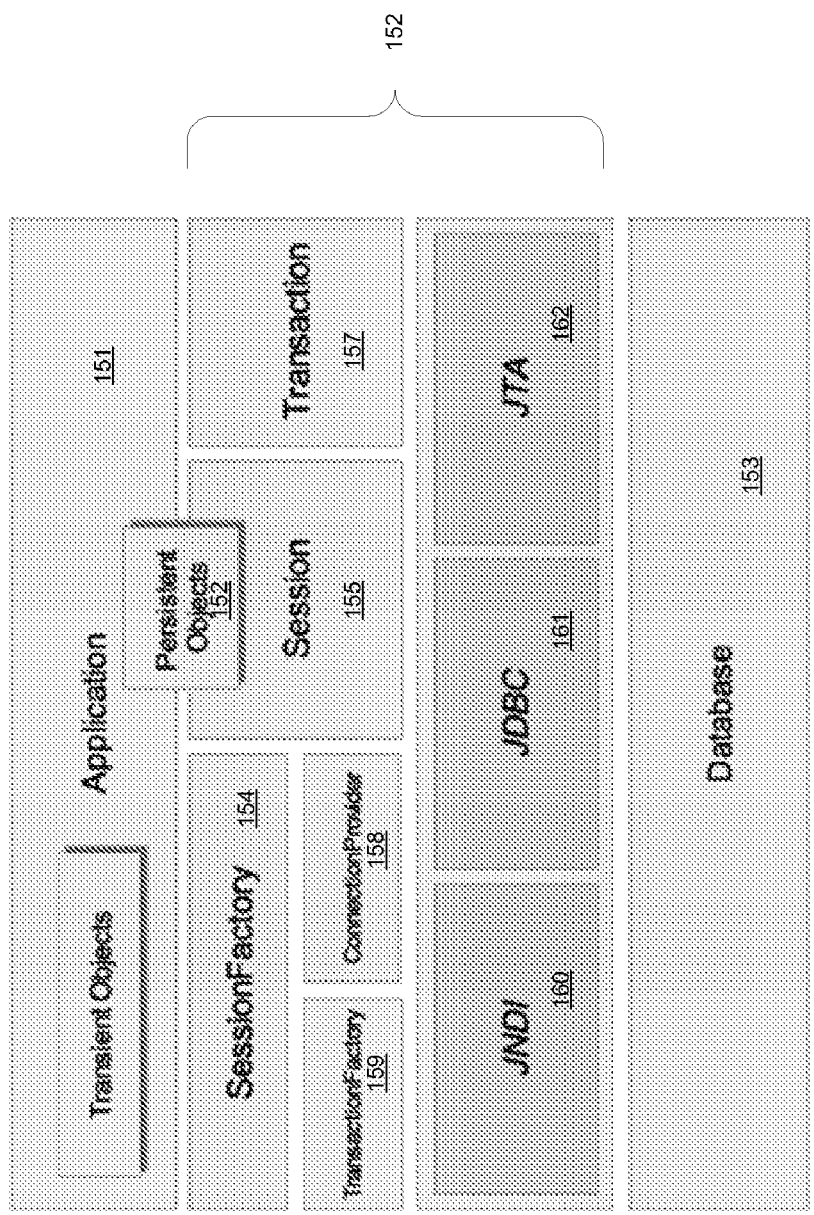
FIG. 2 is a block diagram illustrating an application framework according to an alternative embodiment of the invention.

FIG. 2 is a block diagram illustrating an application framework according to an alternative embodiment of the invention. Referring to FIG. 2, similar to framework 100 as shown in FIG. 1, framework 150 includes, but is not limited to, an application 151 accessing database 153 via an application framework 152 which may be implemented as part of framework 102 of FIG. 1. In this example, framework 152 is configured to provide persistent services to application 151.

Framework 152 includes a variety of components. For example, session factory 154 is configured to provide a thread-safe (immutable) cache of compiled mappings for a single database. Session factory 154 is a factory for session 155 and a client of connection provider 158 and it may hold an optional (e.g., second-level) cache of data that is reusable between transactions, at a process- or cluster-level. Session 155 is a single-threaded, short-lived object representing a conversation between the application 151 and the persistent store 153. Session 155 wraps a JDBC connection and is a factory for transaction 157. Session 155 holds a mandatory (first-level) cache of persistent objects, which are used when navigating an object graph or looking up objects based on an identifier.

Persistent objects 156 are short-lived, single threaded objects containing persistent state and business function. Persistent objects 156 may be, for example, ordinary JavaBeans/POJOs (plain old Java objects). Persistent objects 156 may be associated with a session (e.g., session 155). As soon as the associated session is closed, the persistent objects 156 may be detached and free to use in any application layer (e.g. directly as data transfer objects to and from presentation). Transaction 157 is a single-threaded, short-lived object used by the application to specify atomic units of work. Transaction 157 abstract applications from underlying JDBC (Java database connectivity), JTA (Java transaction API), and/or CORBA (common object request broker architecture) transactions. A session may span several transactions in some situations.

The JDBC API is the industry standard for database-independent connectivity between the Java programming language and a wide range of databases—SQL databases and other tabular data sources, such as spreadsheets or flat files. The JDBC API provides a call-level API for SQL-based database access. The JTA specifies standard Java interfaces between a transaction manager and the parties involved in a distributed transaction system, such as the resource manager, the application server, and the transactional applications. The CORBA is a standard defined by the Object Management Group (OMG) that enables software components written in multiple computer languages and running on multiple computers to interoperate. CORBA "wraps" program code into a bundle containing information about the capabilities of the code inside and how to call it. The resulting wrapped objects can then be called from other programs (or CORBA objects) across a network. CORBA uses an interface definition language (IDL) to specify the interfaces that objects will present to the world. CORBA then specifies a "mapping" from IDL to a specific implementation language like C++ or Java.

Referring back to FIG. 2, connection provider 158 is a factory for (and pool of) JDBC connections. Connection provider 158 abstracts application 151 from underlying data sources or driver managers (e.g., JNDI or Java naming and directory interface 160, JDBC 161, and JTA 162). Transaction factory 159 is a factory for transaction 157 instances. Framework 150 supports a variety of databases, including, for example, Oracle, DB2, Sybase, MS SQL server, MySQL, etc. In one embodiment, framework 150 further includes cache APIs as described above with respect to FIG. 1. Note that some or all of the components as shown in FIGS. 1-2 may be implemented in hardware, software, or a combination of both hardware and software.

Figure 4:
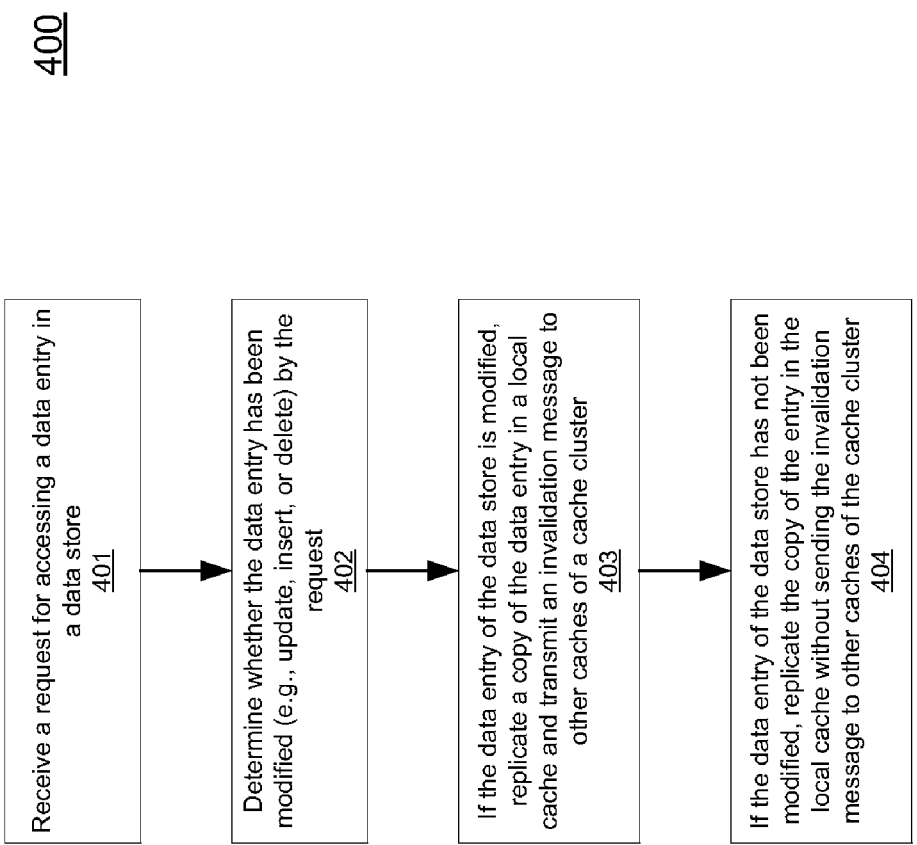
FIG. 4 is a flow diagram illustrating a process for cache accesses according to one embodiment of the invention.

FIG. 4 is a flow diagram illustrating a process for cache accesses according to one embodiment of the invention. Note that process 400 may be performed by processing logic which may include software, hardware, or a combination of both. For example, process 400 may be performed by systems as shown in FIGS. 1-3. Referring to FIG. 4, at block 401, processing logic receives a request for accessing a data entry in a data store. At block 402, processing logic determines whether the data entry has been modified by the request (e.g., updated, inserted, or deleted). At block 403, if the data entry of the data store has been modified, processing logic invokes a cache API dependent upon the specific transaction of the data entry accesses (e.g., "put from update", "put from insert", or "put from delete", etc. as shown in FIG. 3). The invoked cache API then replicates a copy of the data entry in a local cache and transmits an invalidation message to other caches of the cache cluster to inform them that the data in their cache memories is stale and should be evicted from the cache memory. At block 404, if the data entry of the data store has not been modified by the request, processing logic invokes a cache API dependent upon the specific transaction of the data entry accesses (e.g., "put from load", etc. as shown in FIG. 3), which only replicates the data without sending an invalidation message to other caches of the cluster. As a result, the number of the invalidation messages sent has been greatly reduced. Other operations may also be performed.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:
1. A computer-implemented method, comprising:
providing a plurality of cache application programming interfaces (APIs) within an object relational mapping (ORM) system for mapping a data object of an object-oriented programming application to a data entry of a relational database, wherein the data object of the object-oriented programming application is incompatible with a format of the relational database, and wherein the object relational mapping system is configured to convert the data object to a structured query language (SQL) query that is specifically tailored to the format of the relational database, wherein the SQL query is transmitted from the ORM system to the relational database as a database transaction for accessing the data entry requested by the data object of the object-oriented programming application;
in response to a first cache request received at a first cache API associated with a transaction for updating a data entry of the relational database, storing the updated data of the data entry in a local cache, the local cache being one of a plurality of members of a cache cluster, and sending an invalidation message to remaining members of the cache cluster to invalidate corresponding cache entries of the remaining members; and
in response to a second cache request received at a second cache API associated with a transaction for loading data from a data entry of the relational database, storing the loaded data in the local cache without sending an invalidation message to the remaining members of the cache cluster, wherein the first cache API is separated and different from the second cache API.

2. The method of claim 1, wherein the invalidation message indicates that data in the remaining members of the cache cluster is stale and should be evicted from cache memories of the remaining members.

3. The method of claim 2, wherein in response to the invalidation message, each of the remaining members of the cache cluster is configured to read from the data entry to update its corresponding cache entry.

4. The method of claim 3, wherein each of the remaining members of the cache cluster is configured to update its cache according to a local schedule of each member respectively.

5. The method of claim 4, wherein the local cache utilizes a cache loader to load data from the relational database into the local cache, wherein the invalidation message further instructs the remaining members of the cache cluster to use the same cache loader to update their respective cache.

6. The method of claim 1, wherein the invalidation message is sent at the end of the transaction after a successful commit to the data entry.

7. The method of claim 1, wherein the invalidation message is sent synchronously with respect to each of the remaining members of the cache cluster.

8. The method of claim 1, wherein the invalidation message is broadcast asynchronously to the remaining members of the cache cluster.

9. A non-transitory machine-readable storage medium having instructions stored therein, which when executed by a machine, cause the machine to perform a method, the method comprising:
providing a plurality of cache application programming interfaces (APIs) within an object relational mapping (ORM) system for mapping a data object of object-oriented programming application to a data entry of a relational database, wherein the data object of the object-oriented programming application is incompatible with a format of the relational database, and wherein the object relational mapping system is configured to convert the data object to a structured query language (SQL) query that is specifically tailored to the format of the relational database, wherein the SQL query is transmitted from the ORM system to the relational database as a database transaction for accessing the data entry requested by the data object of the object-oriented programming application;
in response to a first cache request received at a first cache API associated with a transaction for updating a data entry of the relational database, storing the updated data of the data entry in a local cache, the local cache being one of a plurality of members of a cache cluster, and sending an invalidation message to remaining members of the cache cluster to invalidate corresponding cache entries of the remaining members; and
in response to a second cache request received at a second cache API associated with a transaction for loading data from a data entry of the relational database, storing the loaded data in the local cache without sending an invalidation message to the remaining members of the cache cluster, wherein the first cache API is separated and different from the second cache API.

10. The non-transitory machine-readable storage medium of claim 9, wherein the invalidation message indicates that data in the remaining members of the cache cluster is stale and should be evicted from cache memories of the remaining members.

11. The non-transitory machine-readable storage medium of claim 10, wherein in response to the invalidation message, each of the remaining members of the cache cluster is configured to read from the data entry to update its corresponding cache entry.

12. The non-transitory machine-readable storage medium of claim 11, wherein each of the remaining members of the cache cluster is configured to update its cache according to a local schedule of each member respectively.

13. The non-transitory machine-readable storage medium of claim 12, wherein the local cache utilizes a cache loader to load data from the relational database into the local cache, wherein the invalidation message further instructs the remaining members of the cache cluster to use the same cache loader to update their respective cache.

14. The non-transitory machine-readable storage medium of claim 9, wherein the invalidation message is sent at the end of the transaction after a successful commit to the data entry.

15. The non-transitory machine-readable storage medium of claim 9, wherein the invalidation message is sent synchronously with respect to each of the remaining members of the cache cluster.

16. The non-transitory machine-readable storage medium of claim 9, wherein the invalidation message is broadcast asynchronously to the remaining members of the cache cluster.

17. An apparatus for mapping a data object of object-oriented programming application to a data entry of a relational database, the apparatus comprising:
a cache cluster; and
hardware processing logic to:
in response to a first cache request received via a first cache application programming interface (API) associated with a transaction for updating a data entry of the relational database, store the updated data of the data entry in a local cache, the local cache being one of a plurality of members of a cache cluster, and to send an invalidation message to remaining members of the cache cluster to invalidate corresponding cache entries of the remaining members; and
in response to a second cache request received via a second API associated with a transaction for loading data from a data entry of the relational database, store the loaded data in the local cache without sending an invalidation message to the remaining members of the cache cluster, wherein the second cache API is separated and different from the first cache API, wherein the data object of the object-oriented programming application is incompatible with a format of the relational database, and wherein the data object is converted to a structured query language (SQL) query that is specifically tailored to the format of the relational database for accessing the relational database.

18. The apparatus of claim 17, wherein the invalidation message indicates that data in the remaining members of the cache cluster is stale and should be evicted from cache memories of the remaining members.

19. The apparatus of claim 18, wherein in response to the invalidation message, each of the remaining members of the cache cluster is configured to read from the data entry to update its corresponding cache entry.

20. The apparatus of claim 19, wherein each of the remaining members of the cache cluster is configured to update its cache according to a local schedule of each member respectively.

21. A computer-implemented method, comprising:
providing a plurality of cache application programming interfaces (APIs) within an object relational mapping (ORM) system of a database server associated with a relational database, the ORM system configured to map a data object of an object oriented programming application programmed in an object-oriented programming language to a data entry of the relational database, wherein the data object of the object-oriented programming application is to request accessing a data entry of the relational database and is incompatible with a format of the relational database;
converting, by the ORM system, the data object to a structured query language (SQL) query that is specifically tailored to the format of the relational database, in response to the data object;
transmitting the SQL query from the ORM system to the relational database as a database transaction for accessing the data entry requested by the data object of the object-oriented programming application;
in response to a first cache request received at a first of the cache APIs of the ORM system of the database server, the first cache request being associated with a first database transaction for updating a first data entry of the relational database, storing the updated data of the first data entry in a local cache, the local cache being one of a plurality of members of a cache cluster, and sending an invalidation message to remaining members of the cache cluster to invalidate corresponding cache entries of the remaining members; and
in response to a second cache request received at a second of the cache APIs of the ORM system of the database server, the second cache request being associated with a second database transaction for loading data from a second data entry of the relational database, storing the loaded data in the local cache without sending an invalidation message to the remaining members of the cache cluster, wherein the first cache API is separated and different from the second cache API maintained by the ORM system of the database server as a single server.

22. A non-transitory machine-readable storage medium having instructions stored therein, which when executed by a machine, cause the machine to perform a method, the method comprising:
providing a plurality of cache application programming interfaces (APIs) within an object relational mapping (ORM) system of a database server associated with a relational database, the ORM system configured to map a data object of an object oriented programming application programmed in an object-oriented programming language to a data entry of the relational database, wherein the data object of the object-oriented programming application is to request accessing a data entry of the relational database and is incompatible with a format of the relational database;
converting, by the ORM system, the data object to a structured query language (SQL) query that is specifically tailored to the format of the relational database, in response to the data object;
transmitting the SQL query from the ORM system to the relational database as a database transaction for accessing the data entry requested by the data object of the object-oriented programming application;
in response to a first cache request received at a first of the cache APIs of the ORM system of the database server, the first cache request being associated with a first database transaction for updating a first data entry of the relational database, storing the updated data of the first data entry in a local cache, the local cache being one of a plurality of members of a cache cluster, and sending an invalidation message to remaining members of the cache cluster to invalidate corresponding cache entries of the remaining members; and
in response to a second cache request received at a second of the cache APIs of the ORM system of the database server, the second cache request being associated with a second database transaction for loading data from a second data entry of the relational database, storing the loaded data in the local cache without sending an invalidation message to the remaining members of the cache cluster, wherein the first cache API is separated and different from the second cache API maintained by the ORM system of the database server as a single server.

* * * * *